United States Patent
Bass et al.

[19]

[11] Patent Number: 6,052,375

[45] Date of Patent: Apr. 18, 2000

[54] HIGH SPEED INTERNETWORKING TRAFFIC SCALER AND SHAPER

[75] Inventors: Brian M. Bass, Apex; Jim P. Ervin; Douglas Ray Henderson, both of Raleigh; Edward Hau-chun Ku, Cary; Joseph Kinman Lee; Scott J. Lemke, both of Raleigh; Joseph M. Rash, Wake Forest; Loren Blair Reiss, Raleigh, all of N.C.

[73] Assignee: International Business Machines Corporation, Armonk, N.Y.

[21] Appl. No.: 08/980,090

[22] Filed: Nov. 26, 1997

[51] Int. Cl.[7] .................................................. H04L 12/56
[52] U.S. Cl. ........................... 370/412; 370/395; 370/429
[58] Field of Search .................................. 370/230, 232, 370/262, 363, 389, 392, 395, 412, 428

[56] References Cited

U.S. PATENT DOCUMENTS

| | | | |
|---|---|---|---|
| 5,280,475 | 1/1994 | Yanagi et al. | 370/60 |
| 5,448,567 | 9/1995 | Dighe et al. | 370/94.2 |
| 5,519,680 | 5/1996 | Kim | 370/17 |
| 5,557,611 | 9/1996 | Cappellari et al. | 370/60.1 |
| 5,602,830 | 2/1997 | Fichou et al. | 370/232 |
| 5,640,389 | 6/1997 | Masaki et al. | 370/418 |
| 5,654,962 | 8/1997 | Rostoker et al. | 370/232 |
| 5,831,971 | 11/1998 | Bonomi et al. | 370/230 |
| 5,864,540 | 1/1999 | Bonomi et al. | 370/235 |
| 5,920,561 | 7/1999 | Daniel et al. | 370/395 |
| 5,953,318 | 9/1999 | Nattkemper et al. | 370/236 |

FOREIGN PATENT DOCUMENTS

| | | |
|---|---|---|
| 0693840 | 1/1996 | European Pat. Off. . |
| 0702472 | 3/1996 | European Pat. Off. . |
| 2307823 | 6/1997 | United Kingdom . |

OTHER PUBLICATIONS

IBM TDB, vol. 37, No. 12, Dec. 1994, pp. 543–544.
IBM TDB, vol. 38, No. 9, Sep. 1995, pp. 143–146.

*Primary Examiner*—Hassan Kizou
*Assistant Examiner*—A. Elallam
*Attorney, Agent, or Firm*—Joscelyn G. Cockburn

[57] ABSTRACT

A method and system are provided for traffic shaping and bandwidth scaling in a high speed internetworking device. A slot time wheel mechanism is provided for traffic rate control and a credit/debit mechanism is provided for traffic shaping and scaling. The high speed traffic scaler and shaper incorporates a programmable slot time wheel, a traffic scaler state machine, a traffic shaper parameter table and a traffic scaler processor. The traffic scaler processor incorporates a traffic queue allocation manager, a queue priority arbiter, a port enable selector, a port priority arbiter and a DMA channel arbiter. The traffic queue allocation manager and the queue priority, port priority and DMA channel arbiters are each controlled by a corresponding state machine. The parameters in the traffic shaper parameter table are dynamically updated for each logical queue and are used to enable the credit/debit mechanism.

26 Claims, 9 Drawing Sheets

| TIME SLOT # | USED CREDIT COUNT | DEBIT COUNT | THRESHOLD | T-FLAG | P-FLAG | U-FLAG |
|---|---|---|---|---|---|---|
| # 0 | Q31 USED CREDIT | Q0 DEBIT | Q31 THRESHOLD | Q0 T-FLAG | Q0 P-FLAG | Q0 U-FLAG |
| • | • | • | • | • | • | • |
| • | • | • | • | • | • | • |
| • | • | • | • | • | • | • |
| • | • | • | • | • | • | • |
| # 31 | Q31 USED CREDIT | Q31 DEBIT | Q31 THRESHOLD | Q31 T-FLAG | Q31 P-FLAG | Q31 U-FLAG |

FIG. 8

HIGH SPEED INTERNETWORKING TRAFFIC SCALER AND SHAPER

BACKGROUND OF THE INVENTION

1. Technical Field

The present invention relates in general to computer network communications, and in particular, to the shaping and scaling of internetworking traffic in high speed network devices.

2. Background Art

With the increasing popularity of the Internet, traffic in some networks which link to popular Internet web sites may become congested periodically. If the network which carries this traffic has fixed bandwidth, significant traffic congestion can occur at peak traffic hours resulting in unacceptable delays. In order to accommodate a dynamic network like the Internet, internetworking infrastructures need a flexible traffic bandwidth scaler so that the network can scale its bandwidth based on the dynamic demand of the traffic.

In addition, many companies are now employing Internet technologies to build private intranets, enabling users in an organization to go beyond electronic mail and access critical data through web browsers. While intranet traffic is currently composed primarily of text, graphics and images, this traffic is expected to expand in the near term to include more bandwidth-intensive audio, video, voice and multimedia applications.

Network backup of servers and storage systems are common in many industries which require enterprise information to be archived. Backups occur during off hours and frequently require large amounts of bandwidth during a fixed period of time. The backup can involve gigabytes of data distributed over hundreds of servers and storage systems in a large enterprise.

As applications proliferate and demand ever greater shares of bandwidth at the desktop and as the total number of users continues to grow, the pressure for increased bandwidth will continue to grow at the desktop, the server, the hub and the switch. Organizations will need to migrate critical portions of their networks to higher-bandwidth technologies, such as Asynchronous Transfer Mode (ATM) and Gigabit Ethernet.

While Gigabit Ethernet technology is starting to evolve, ATM technology has been available for several years and the problem of traffic management in ATM networks has been under discussion for some time. However, the present invention is not limited to ATM or to Gigabit Ethernet technology and the basic concepts pertaining to traffic shaping apply to any high speed network.

Traffic supported by the network is classified according to several characteristics including bandwidth and latency. Bandwidth is the amount of network capacity required to support a connection. Latency is the delay associated with a connection. Traffic shaping is performed at the user-network interface. Devices that implement traffic shaping are typically network adapters in workstations, hubs, bridges, and routers.

Congestion can occur in any network whether it uses shared media like most LAN technologies, or wideband technologies such as ATM or Gagabit Ethernet. Congestion occurs whenever an application sends more data than the network can transmit with the available bandwidth. As more applications send data over the same network, the bandwidth available to any one application dynamically changes over time. When applications send more data than the network can handle, the network buffers fill up and can overflow. The application then has to retransmit data further adding to traffic congestion.

A variety of techniques have been applied to deal with the problem of network congestion control: these techniques include end-to-end, link-by-link, rate-based and credit-based traffic flow control. With end-to-end control, the network measures the minimum available bandwidth along an entire connection path and communicates the bandwidth to the application which then transmits at the appropriate rate. Each link along the path forwards the data as fast as it is received. With link-by-link control, each link along the connection path controls its traffic flow independently. Each link buffers data as needed to adjust the incoming speed to the outgoing speed.

More germane to the instant application are rate-based and credit-based techniques. In the rate-based technique, the network tells the application what transmission rate the sending device should use. When the network becomes congested, it reduces the rate and notifies the application. When the network is no longer congested, the rate is increased. In the credit-based technique, the network indicates to the sending device the amount of traffic space available in the network (credits). The network periodically replenishes the application's credits. When the network becomes congested, the application gets fewer credits and they are replenished less often. This causes the application to reduce its sending of data. When the network is no longer congested, the number of credits is increased and replenished more often.

In high speed networking, there has been much debate over whether a rate-based or a credit-based congestion control scheme is the more appropriate.

Therefore, there is a need for a high speed real-time bandwidth scheduler and shaper that combines the benefits of rate-based and credit-based techniques.

SUMMARY OF THE INVENTION

It is therefore an object of the invention to provide an improved bandwidth scheduler for an internetworking device in a computer network.

It is another object of the invention to provide a traffic shaping mechanism for an internetworking device in a computer network that combines time-based and credit-based techniques.

It is a further object of the invention to provide a bandwidth scheduling and shaping mechanism that enables an internetworking device to regulate or scale network traffic entering and leaving a device based on the availability of device resources and the dynamic demands of network traffic.

The present invention uses a slot time wheel mechanism for traffic rate control, and a credit/debit scheme for traffic shaping and bandwidth scaling. The combined time/credit based mechanism provides a flexible traffic scheduler for internetworking devices such as edge switches to regulate or scale network traffic entering and exiting the device based on the availability of switch resources and the dynamic demands of network traffic. By appropriate programming of time/credit control parameters, the traffic scaling can be applied to applications requiring time-oriented transport from a source network node to a destination network node.

The credit/debit scheme uses a "borrow credit first, debit return later" for traffic shaping control. This provides the ability to send a variable size data frame on demand and payback the used credit after the transmission. This is in contrast with the widely used alternative scheme of accumulating sufficient credit before the data frame can be transmitted, which increases the latency of the system. The programmable slot time wheel is used to control the rate of traffic scheduling and shaping thereby providing a flexible way of supporting time-critical traffic like multimedia data transmission in real-time applications. Also provided in the preferred embodiment of this invention is an unregulated queue mechanism to provide a "best-effort" service capability for bursty traffic queues. Therefore, when there is momentary high bursty traffic entering the internetworking device, a better quality of service (QOS) is provided to accommodate the surge in network demand.

The above as well as additional objects, features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use and further objects and advantages, will best be understood by reference to the following detailed description of an illustrative embodiment, when read in conjunction with the accompanying drawings, wherein:

FIG. 8 illustrates the structure of the traffic shaper parameter table of the present invention.

DETAILED DESCRIPTION

Figure 1:
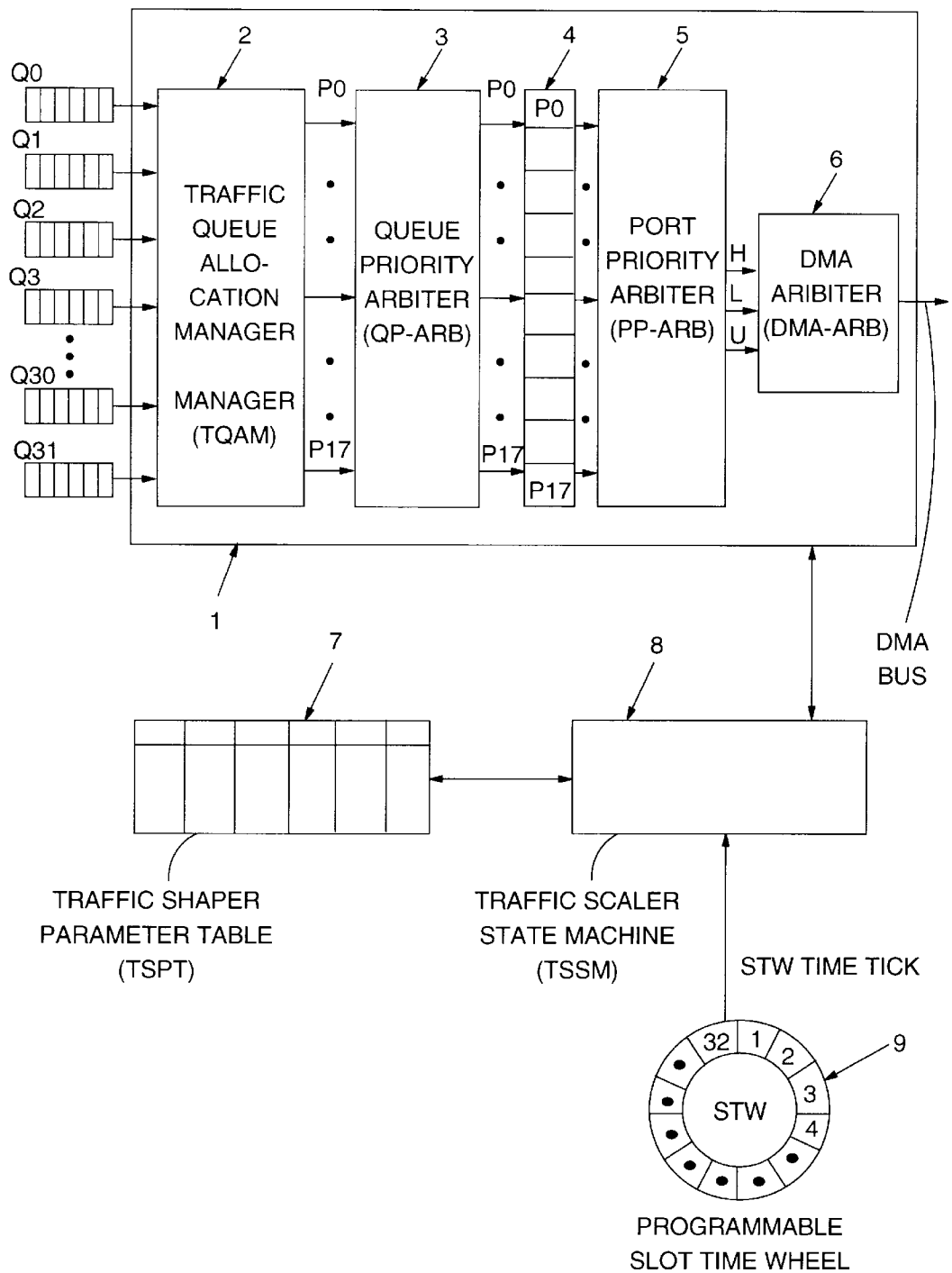
FIG. 1 illustrates a high level block diagram of the high speed traffic scaler and shaper of the present invention.

In accordance with the present invention, shown in FIG. 1 is a block diagram of the high speed traffic scaler and shaper (HSTS). The major components are a programmable slot time wheel (STW) 9, a traffic scaler state machine (TSSM) 8, a traffic shaper parameter table (TSPT) 7, and a traffic scaler processor complex 1. The components of traffic scaler processor complex 1 include a traffic queue allocation manager (TQAM) 2, a queue priority arbiter (QP-ARB) 3, a port enable selector 4, a port priority arbiter (PP-ARB) 5, and a direct memory access (DMA) channel arbiter (DMA-ARB) 6. The components of the high speed traffic scaler and shaper are implemented within one or more Application Specific Integrated Circuits (ASICs).

In general, the HSTS operates based on a time slot pacing scheme, controlled by the STW 9, for scheduling of the logical queues and the output ports. The traffic scaling and shaping operations are controlled by the combination of the TSSM 8 and the TSPT 7 working in conjunction with the traffic scaler processor complex 1.

Figure 2:
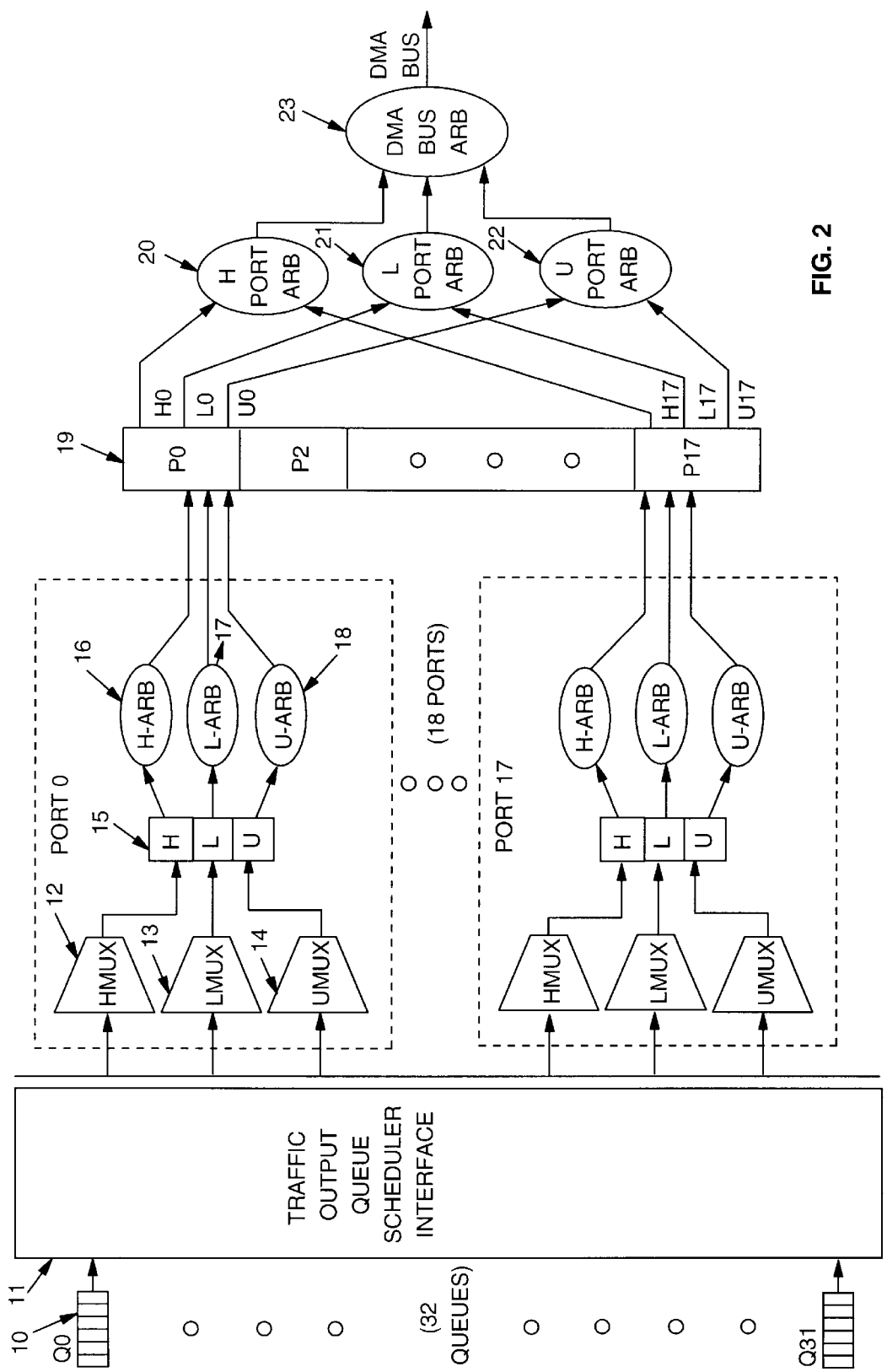
FIG. 2 illustrates a data flow diagram of the high speed traffic scaler and shaper of the present invention.

In the illustrative embodiment disclosed, FIG. 2 serves to demonstrate the functional flow of the high speed traffic scaler (HSTS). In this example, the traffic scaler has 32 logical queues 10 and 18 output ports. Each input logical queue can carry data queues with one of three different priorities namely, high-regulated priority (H), low-regulated priority (L), and unregulated priority (U).

Figure 9:
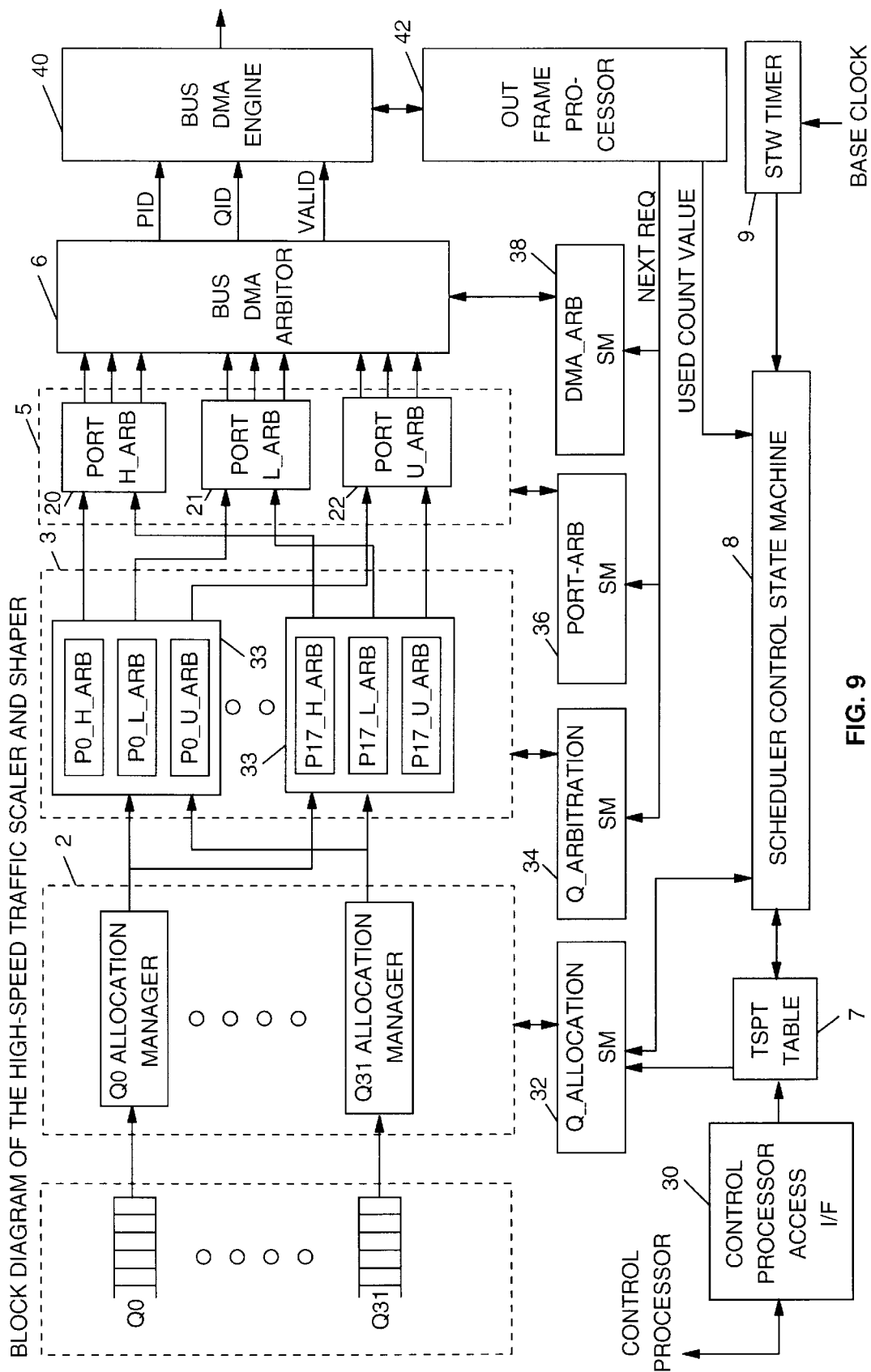
FIG. 9 illustrates a more detailed block diagram of the high speed traffic scaler and shaper of the present invention.

FIG. 9 is a more detailed block diagram of the high speed traffic scaler and shaper illustrating the processing of 32 logical queues into 18 output ports. The actual number of logical queues and output ports is within the purview of the system designer. The main control of the scaler system is controlled by the scheduler control state machine 8 (corresponds to TSSM in FIG. 1). The processing clock of this state machine is supplied by the STW timer 9 which derives the STW clock from a base clock.

After system reset, the system control processor updates the TSPT table 7 and the STW timer 9 with the initial configuration parameters through control processor access interface 30. Once the STW timer 9 is loaded, it starts to run and every time the STW timer 9 expires, it sends a STW clock pulse to the scheduler control state machine 8 to perform the queue scheduling operation. Part of this queue scheduling operation is to process the credit debiting task in the TSPT table 7. The other part of the scheduling operation is to coordinate the Q-Allocation state machine 32 to perform the queue allocation operation in the corresponding queue allocation managers 2. Depending on the specific queue control parameters, each queue allocation manager 2 allocates the valid queues to the appropriate queue priority arbiters 3 (H/L/U queue priority arbiters).

Each one of the 18 queue priority arbiters 3 arbitrates within its H/L/U internal arbiters 33 to come out with 18-H, 18-L and 18-U selected queue groups. Each of these selected queue groups is then fed into three individual port priority arbiters (namely, the H-port priority arbiter 20, the L-port priority arbiter 21, and the U-port priority arbiter 22). Each of these port priority arbiters 20, 21, 22 arbitrates within its own group in a round robin fasion and selects one valid queue from each group. These three selected queues (H/L/U) are then fed to the 3-way bus DMA arbiter 6 where a pure priority arbitration process is performed to select one final selected queue to be fed to the DMA engine 40 to be processed.

At the end of the DMA process of the current queue, the DMA engine 40 notifies the out frame processor 42 which in turn notifies the scheduler control state machine 8 of the used count value to be updated in the TSPT table 7. At the same time, the out frame processor 42 also instructs the Q-arbitration state machine 34, the port-arbitration state machine 36, and the DMA arbitration state machine 38 to perform the next arbitration cycle. Each of these arbitration state machines 34, 36, 38 controls the arbitration process of the corresponding arbiter 3, 5, 6 respectively.

The processing rate of the HSTS is controlled by the programmable slot time wheel (STW) 9. The shorter the time slot period, the faster the traffic scaling process. FIG. 8 shows the structure of the traffic shaper parameter table (TSPT) 7. The functions of the different parameters in the TSPT table 7 are described as follows.

Time Slot Number—Each time slot number corresponds to one of the 32 input logical queues 10. An individual input logical queue 10 can only be processed in its assigned time slot.

Used Credit Count—This is the credit count (in bytes) that an input logical queue 10 has used to move data frames.

Each time the bus DMA engine moves a data frame, the used credit count corresponding to the logical queue from which the frame was processed is incremented by the value of the number of data bytes that have been moved.

Debit Count—This is a preset constant value which the TSSM 8 will decrement from the used credit count during the time-slot processing of the queue. The basic scheme is that, after a queue 10 has used some credit to move data out of the output ports, the debit count value is a preset constant value that a queue 10 pays back for the used credit at each time slot. The value of the used credit counter will never go below 0.

Threshold—This is a preset reenable threshold value (in credit units) which the TSSM 8 uses for comparison at each time-slot processing cycle. If the used credit count is less than the threshold value, the T-flag is set to 1. If the used credit count is more than the threshold value, the T-flag is reset to 0. Any time the T-flag is set to 1, the selected queue 10 is enabled to allocate data.

T-Flag—This is the transmit enable flag which enables the selected queue 10 to move data from the high or low priority regulated queues to the output port. It is controlled by the TSSM 8 based on the HSTS processing algorithm.

P-Flag—This is a queue priority flag which indicates the processing priority of the queue. If the P-flag is set to 1, it indicates that the queue has a high-regulated traffic processing priority. If the P-flag is set to 0, it indicates that the queue has a low-regulated traffic processing priority.

U-Flag—When the U-flag is set to 1, it indicates that the queue is enabled to participate in the unregulated arbitration process. A logical queue which can have high or low priority can also have the U-flag set to 1. In this case, the assigned queue 10 is enabled to participate in either the high regulated or the low regulated as well as the unregulated arbitration process. This scheme is very useful for "best-effort" service when a logical queue has over-subscribed its assigned bandwidth.

As shown in FIG. 2, each of the 32 input logic queues 10 is fed to the traffic output queue scheduler interface 11, where all the input logical queues are interconnected to feed the 18 output ports. In each output port, the selected input queues are sorted and multiplexed by the traffic queue allocation manager 2. This includes three queue priority multiplexers (HMUX 12, LMUX 13, UMUX 14) and three queue priority selectors (H,L,U) 15. The outputs of the three queue priority selectors 5 are fed to their corresponding queue priority arbiters (namely H-ARB 16, L-ARB 17, and U-ARB 18). Each of the queue priority arbiters 16, 17, 18 processes the individual queues 10 in a round robin fashion. The outputs of the individual queue priority arbiters 16, 17, 18 are fed to the out-queue port DMA interface 19 which manages the port level enabling or disabling function. Each port has three selected out-port queues (Hx, Lx, Ux). The Hx out-port queues of each port are fed to a H-port-priority-arbiter 20. The Lx out-port queues of each port are fed to an L-port-priority arbiter 21. The Ux out-port queues of each port are fed to a U-port-priority arbiter 22. The three port arbiters arbitrate all the corresponding out-port queues into three selected out-port priority queues. These three selected out-port priority queues are then fed to a DMA bus arbiter 23 which arbitrates the selected out-port priority queues in a straight priority fashion. The final selected DMA queue will be fed to the DMA bus to complete the process.

As described above, the result of the process is that the DMA channel will service all the high priority regulated queues first followed by all the low priority regulated queues. After the regulated queues are serviced, the unregulated queues will have their turn. For logical queues 10 which have the U-flag set in the TSPT table 7, they are enabled to participate in the unregulated queue DMA arbitration process. This is useful if a particular logical queue is over-subscribed for its allocated bandwidth. The overflow data can be serviced using the unregulated DMA cycles if they are available.

Figure 3:
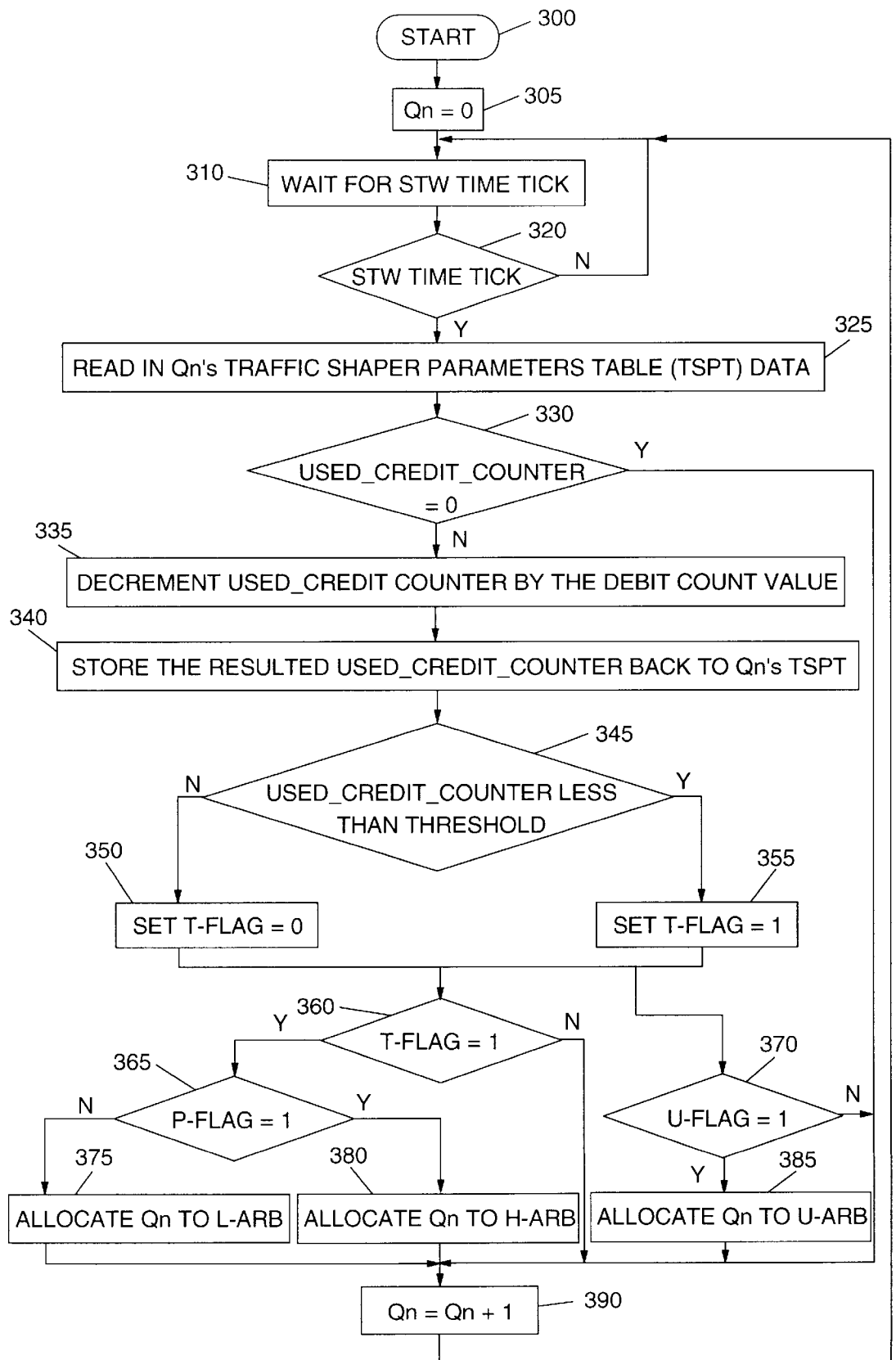
FIG. 3 illustrates a high level flow chart of the control algorithm of the slot time wheel of the present invention.

Shown in FIG. 3 is a flow chart of the control algorithm of the TSSM 8. The main task of the TSSM 8 is updating the traffic shaper parameter table 7 for each of the input logical queues 10. During this process, the used credit counter is decremented with the debit count value and the T-flag will be set to the appropriate state based on the value of the used credit counter and the threshold value. The allocations of the queues 10 to the corresponding queue priority arbiters 3 are also determined during this process.

The slot time wheel control algorithm process starts in logic step 300. At logic step 305, the first logical queue 10 is selected. As indicated by logic block 310, this process goes into a wait state for the arrival of the next STW time tick. In decision block 320, a test is made for occurrence of the next STW time tick (i.e., corresponding to the expiration of the STW timer). Until the occurrence of the next STW time tick, the process continues the wait state depicted in logic step 310. When the time tick does occur, in logic step 325, the traffic scaler state machine 8 reads in the data from traffic shaper parameter table 7 for the corresponding logical queue.

Next in decision block 330, a test is made to determine if the used credit counter for the logical queue is equal to zero. If the result of the test is true, then the process increments to the next logical queue in logic step 390 (i.e., corresponding to the next time slot in TSPT 7). Otherwise, the process proceeds to logic step 335 where the used credit counter is decremented by the debit count value. However, if the debit count value is greater than the used credit count, the used credit count is set to zero. In logic step 340, the used credit count value is stored back to the logical queue's entry in the TSPT 7. The next step in decision block 345 tests if the used credit counter is less than the threshold value for the logical queue. If it is, then in logic step 355 the transmit enable T-flag is set to one. If the used credit counter exceeds the threshold value, the T-flag is reset to zero in logic step 350.

Both paths out of decision block 345 then enter decision block 360 and decision block 370. In decision block 360, a test is made on the T-flag. If it is reset to zero, the process drops to logic block 390 where the logical queue is incremented and the process returns to logic step 310. If the T-flag is set to one, then in decision block 365, the queue priority P-flag is tested. If the P-flag is set to one, it indicates that the logical queue has a high regulated traffic processing priority, and the logical queue is allocated to the high queue priority arbiter as indicated by logic step 380. If the P-flag is set to zero, it indicates that the logical queue has a low regulated traffic processing priority. In this case, the logical queue is allocated to the low queue priority arbiter as indicated by logic step 375. In addition to the T-flag test made in decision block 360, a U-flag test is also made in decision block 370. If the U-flag is set to one, the logical queue is enabled to participate in the unregulated arbitration process indicated in logic step 385. Thus, if both the T-flag and U-flag are set to one, the assigned queue is enabled to participate in both the H/L regulated and the unregulated arbitration processes.

Figure 4:
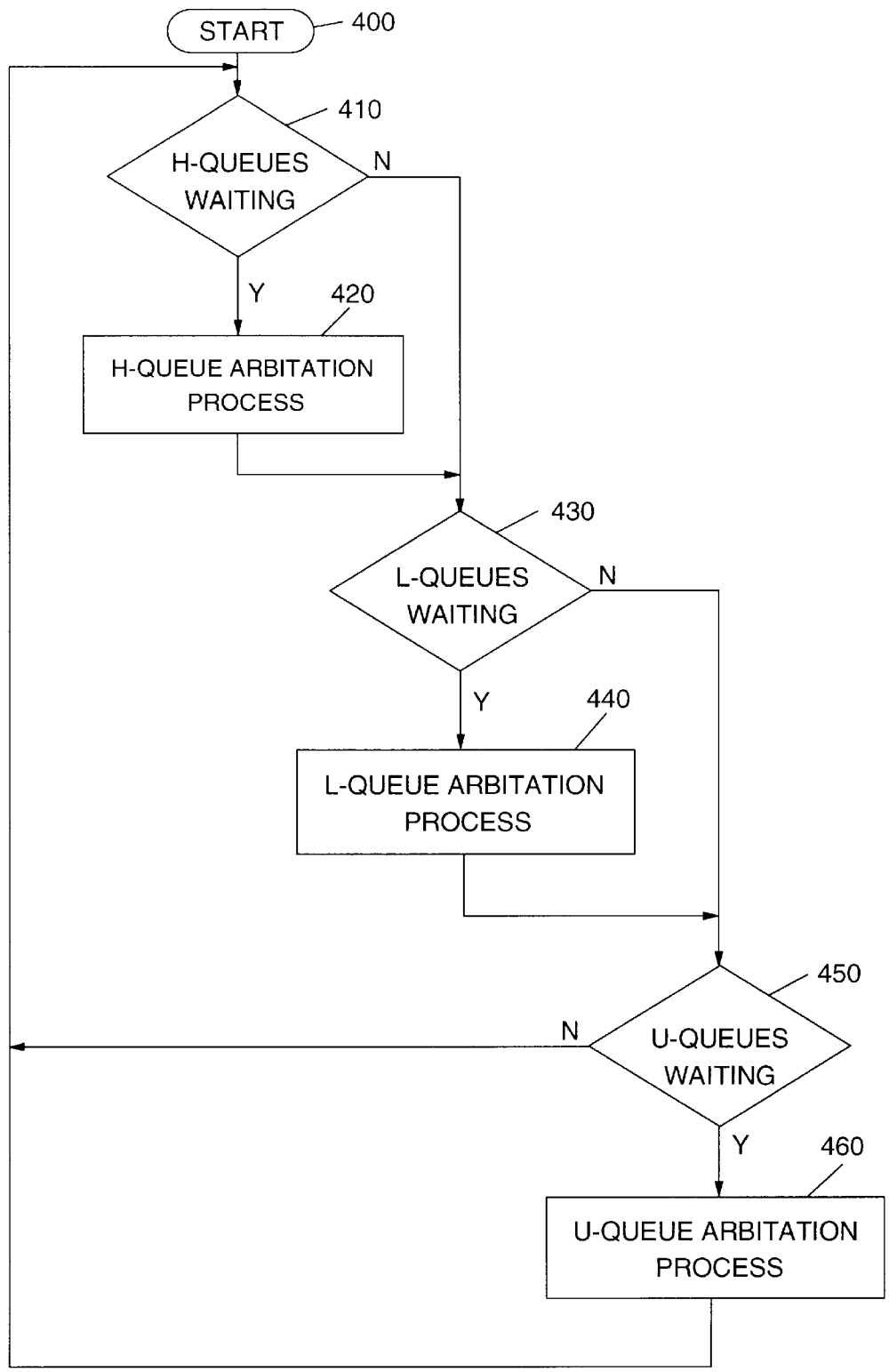
FIG. 4 illustrates a high level flow chart of the queue priority arbiter of the present invention.

Shown in FIG. 4 is a flow chart of the control process of the queue priority arbiter 3. In this process, all the logical queues 10 allocated to each of the H/L/U priorities are arbitrated within each priority and three single priority selected queues are generated.

The queue priority arbiter control algorithm process starts in logic step 400. In decision block 410, a test is made to determine if there are logical queues allocated to participate in the high regulated queue arbitration process. If yes, the process proceeds to logic step 420 where the high regulated queue arbitration process is executed. If there are no logical queues assigned to participate in the arbitration process, or if the arbitration process of logic step 420 has completed, decision block 430 is entered where a test is made for logical queues allocated to the low regulated queue arbitration process. If the result of the test is yes, then the low regulated queue arbitration process is executed in logic step 440. If the result of the test is no, or if the low regulated queue arbitration process in logic step 440 has completed, decision block 450 is entered to test if there are logical queues assigned to participate in the unregulated queue arbitration process. If the result of the test is yes, then the unregulated queue arbitration process is executed in logic step 460. If there are no logical queues waiting for this unregulated queue arbitration process, or if the unregulated queue arbitration process has completed, the process returns to decision step 410.

Figure 5:
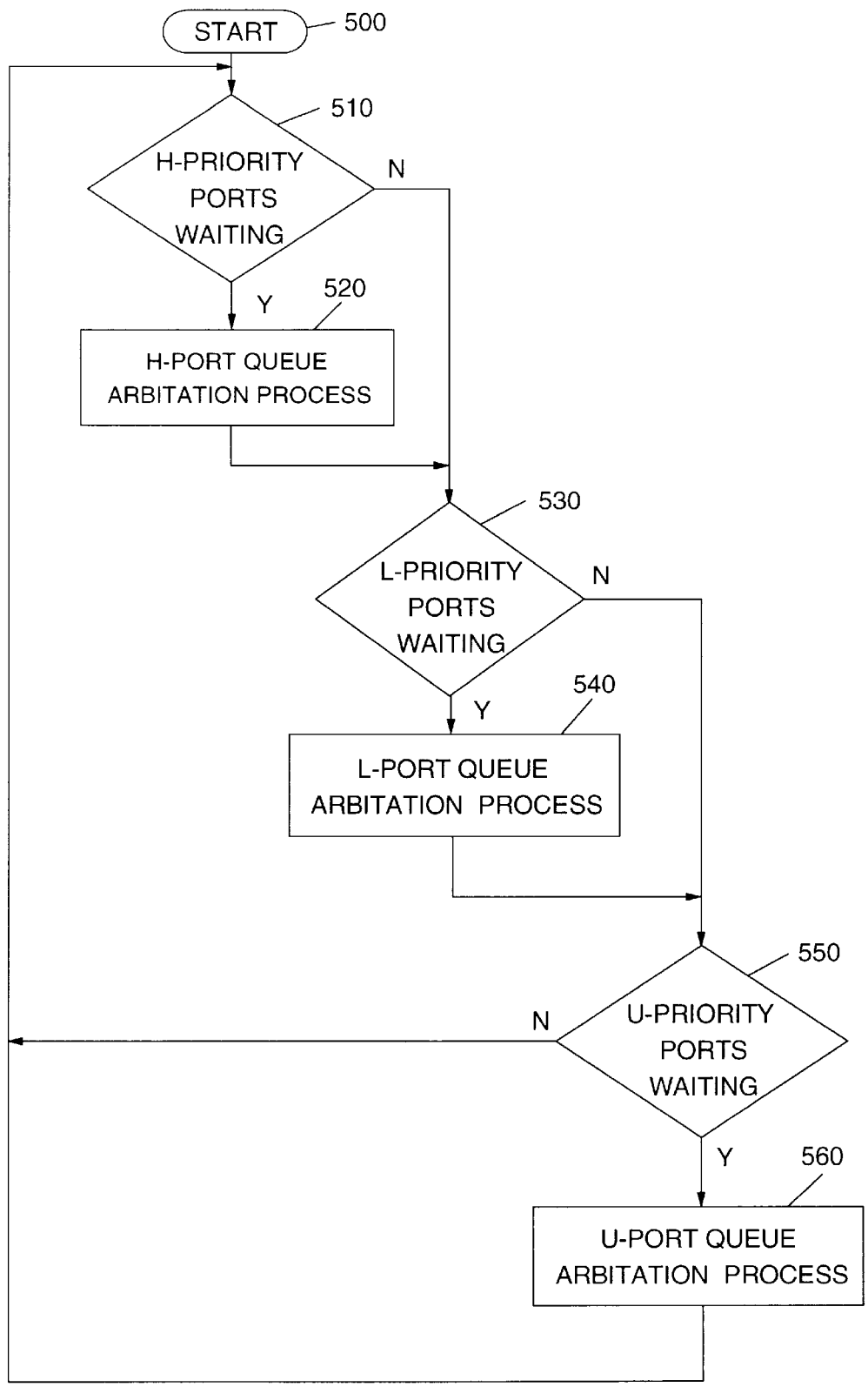
FIG. 5 illustrates a high level flow chart of the port priority arbiter of the present invention.

Shown in FIG. 5 is a flow chart of the control process of the port priority arbiter 5. In this process, all the H-queues from each of the 18 ports are arbitrated into one selected H-DMA queue. All the L-queues from each of the 18 ports are arbitrated into one selected L-DMA queue. All the U-queues from each of the 18 ports are arbitrated into one selected U-DMA queue.

The port priority arbiter control process algorithm starts in logic step 500. In decision block 510 a test is made to determine if there are any high priority queues waiting from the 18 ports as a result of the queue priority arbiter process of FIG. 4. If yes, then in logic step 520, the high priority port queue arbitration process is executed which results in one high priority DMA queue. If no, or if the high priority port queue arbitration process of logic step 520 has completed, processing proceeds with decision block 530 in which a determination is made as to whether there are any low priority queues waiting from the 18 ports as a result of the queue priority arbiter process of FIG. 4. If yes, then the low priority port queue arbitration process is executed in logic step 540. After the low priority port queue arbitration process completes in logic step 540, or if there are no low priority queues waiting to be processed, processing continues to decision block 550. The result of executing low priority port queue arbitration process 540 is one low priority DMA queue. If there are any unregulated queues waiting from the 18 ports as a result of the queue priority arbiter process of FIG. 4, then the unregulated port queue arbitration process is executed in logic step 560, which results in one unregulated DMA queue. If there are no unregulated queues waiting from the 18 ports, or if the unregulated port queue arbitration process has completed, the process returns to decision step 510.

Figure 6:
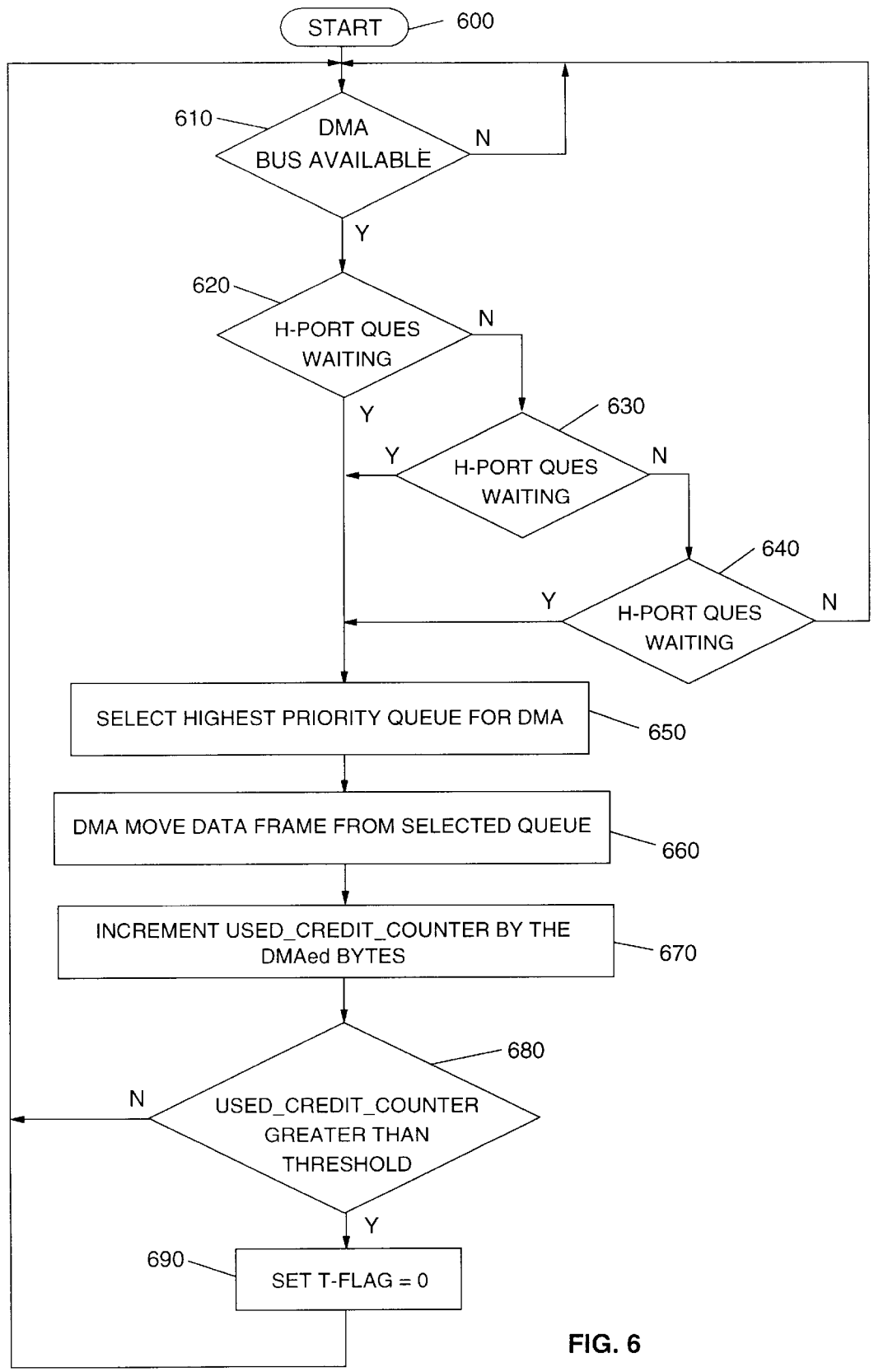
FIG. 6 illustrates a high level flow chart of the DMA bus arbitration process of the present invention.

Shown in FIG. 6 is a flow chart of the control process of the DMA arbiter. In this process, the DMA arbiter selects one of the DMA queues based on a straight priority process and initiates the DMA process to move the frame data from the selected queue. After the DMA move, the number of data bytes moved are added to the used credit counter. Then, the value of the incremented used credit counter value is compared with the value of the threshold value. If the result of the comparison is such that the used credit counter value is greater than the threshold value the T-flag is reset to 0.

The DMA bus arbitration control process algorithm starts in logic step 600. In decision block 610, a test is made as to whether the DMA bus is available. If the DMA bus is available, then decision block 620 is entered to determine if there are any high priority port queues waiting to be processed. If yes, then in logic step 650, the high priority queue is selected for DMA bus access. If in decision block 620, there are no high priority port queues waiting, decision block 630 is entered where a determination is made if there are any low priority port queues waiting to be processed. If yes, then logic block 650 is entered to select the low priority queue for DMA bus access. Otherwise, processing proceeds with decision block 640 where a test is made to determine if there are any unregulated port queues waiting to be processed. If there are, then logic step 650 is entered to select the unregulated queue for DMA bus access. If the result of the test in decision block 640 is that there are no unregulated port queues waiting to be processed, then a return is made to decision block 610 to await DMA bus access.

Following a positive outcome from any of decision blocks 620, 630 and 640 and selection of the highest priority queue for DMA bus access in logic step 650, the data frame is actually moved from the selected DMA queue in logic step 660. Next in logic step 670, the used credit counter corresponding to the logical queue having its data frames moved is incremented by the number of data bytes that have been moved. This is followed in decision block 680 by a test as to whether the used credit counter is greater than the threshold value corresponding to the logical queue. If no, the process returns to decision block 610 to await DMA bus access. If the used credit counter exceeds the threshold, the transmit enable T-flag for the logical queue is reset to zero in logic step 690 and the process returns to decision block 610 to await DMA bus access.

The traffic scaler and shaper offers the network manager many options for controlling frame flows. For example, a server may be feeding audio-video frames to the network. Since these frames are time-critical, they would be assigned to a queue which has the property of regulated high priority. Other frames would be assigned to a queue(s) which has the property of unregulated. When using the scheduler in this manner, it provides frame flow from one port to another port to meet the time-based requirements for audio-video type flows. This might be used in a case where a web server is providing both real time video and audio to a client.

The traffic scaler and shaper also can be used to provide rate-based frame flows. For instance, consider the case where there are 32 100 Mbps ports attached to workstations and one 1000 Mbps port attached to a server backbone. Each of the 32 ports is assigned to a logical queue (total of 32 queues). With the credit-based scheduler, the network manager can set how much bandwidth each 100 Mbps port can use from the 1000 Mbps port. For total fairness, the manager can assign (1000/32) Mbps of bandwidth to each queue. This would allow each of the ports to use only 31.25 Mbps of regulated bandwidth. However, if one or more of the ports do not use the allocated 31.25 Mbps, the extra bandwidth can be used by those ports that are set to use unregulated bandwidth. The network manager may elect to assign some of the ports 100 Mbps of bandwidth for power users and less bandwidth for other ports. In addition to the rate-based assignments, frames can be classified by priority. For example, the network manager can assign web-based frames a higher priority which would then provide low latency on those frames.

Figure 7:
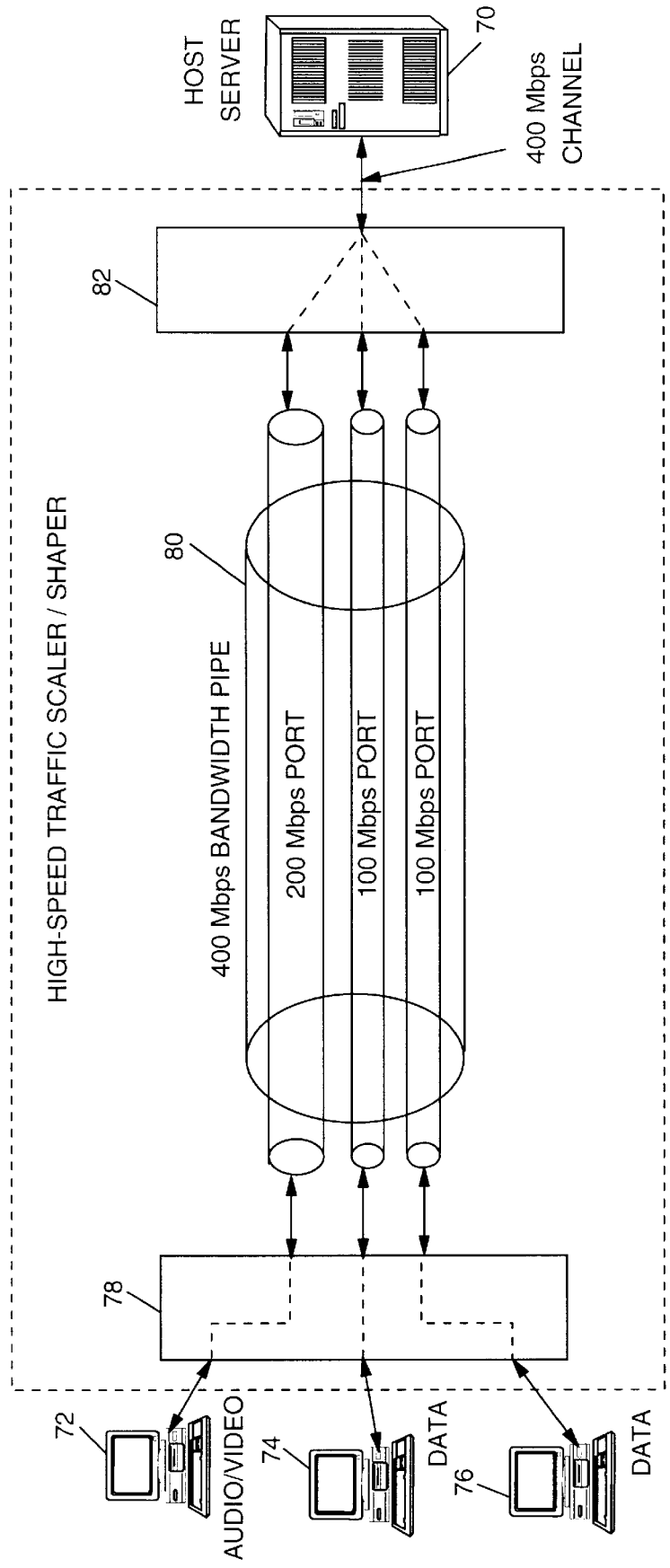
FIG. 7 illustrates an example of the application of the high speed traffic scaler and shaper of the present invention.

FIG. 7 illustrates an example of the application of the high speed traffic scaler and shaper to allocation of a 400 Mbps channel to a host server 70. It shows three workstations 72, 74, 76 sending traffic to host server 70 across a 400 Mbps logical bandwidth pipe 80. Block 78 corresponds to traffic queue allocation manager 2 and queue priority arbiter 3 of FIG. 1. Block 82 corresponds to port priority arbiter 5 and DMA arbiter 6 of FIG. 1. As can be seen, the audio-video application at workstation 72 has been allocated 200 Mbps of the 400 Mbps bandwidth. Data applications at workstations 74 and 76 have each been allocated 100 Mbps of the 400 Mbps bandwidth.

In summary, what has been described above is the architecture of a high speed traffic scaler and shaper which can be used to shape the traffic of a dynamic network like the Internet from both the network user's end or the network provider's end. Since this design combines the benefits of both a credit-based and a rate-based controlling scheme, it provides a versatile architecture which can be applied to both normal traffic or time-critical traffic.

The unique features of the high speed traffic scaler (HSTS) of the present invention have been disclosed including:

a) a combined credit-based and rate-based scheduling scheme to take advantage of the benefits of both;

b) a "borrow credit first, debit return later" algorithm for traffic shaping control—this provides the ability to send a variable size data frame on demand and payback the used credit after the transmission;

c) a programmable slot time wheel scheme to control the rate of scheduling and shaping—this feature provides a flexible way of supporting the time-critical traffic like multimedia data transmission in real-time applications;

d) an unregulated queue scheme to provide a "best effort" service capability for bursty traffic queues—this means that, for network traffic having a momentary high bursty profile, this design provides a better quality of service to accommodate unexpected network surge;

e) manipulation of the rate-based parameters and the credit-based parameters in the traffic shaping parameter table (TSPT), to enable the traffic scaler to control a network or bus system for applications that requires high precision traffic control and metering.

While the invention has been particularly shown and described with reference to a preferred embodiment, it will be understood by those skilled in the art that various changes in form and detail may be made therein without departing from the spirit and scope of the invention. Specifically, while a hardware implementation has been described, it will be understood that the invention can be implemented in hardware, software or firmware. Furthermore, it will be understood by those skilled in the art that such implementations could be embodied within program products, which include but are not limited to programs fixed in some signal bearing media (e.g., web pages, bulletin boards, telnet sites, etc.) Or recordable media (e.g., magnetic floppy disk, digital tape, CD ROM, etc.).

Having thus described our invention, what we claim and desire to secure as Letters Patent is as follows:

1. A traffic scaling and shaping apparatus for shaping the output traffic in a high speed computer network device, said apparatus comprising:

a timing mechanism for the scheduling of a plurality of logical queues, each logical queue having associated therewith valid data queues of at least one priority type;

a parameter table for storing for each logical queue a plurality of parameter values used to control the shaping of output traffic;

a traffic scaler mechanism for manipulating the traffic shaper parameter values for each of said logical queues;

a traffic queue allocation manager for allocating each said valid data queue for each said logical queue to a different one of output ports;

a plurality of queue priority arbiters associated with each output port for performing internal arbitration of each valid data queue allocated to it, said internal arbitration resulting in a plurality of priority-based queues for said each output port;

a plurality of port priority arbiters, each port priority arbiter corresponding to a separate priority type, for selecting a valid queue for each priority type; and a bus DMA arbiter for selecting a final queue to be processed from said selected valid queues of each priority type.

2. The traffic scaling and shaping apparatus of claim 1 wherein said timing mechanism derives its clock from a base clock, and sends a clock pulse to said traffic scaler mechanism to initiate a queue scheduling operation.

3. The traffic scaling and shaping apparatus of claim 1 wherein said valid data queues associated with each logical queue are characterized as a high priority regulated queue, a low priority regulated queue, and an unregulated queue.

4. The traffic scaling and shaping apparatus of claim 1 wherein said parameter table includes for each logical queue, a used credit count value, a debit count value, a threshold value, a transmit enable flag value, a queue priority flag value and an unregulated queue flag value.

5. The traffic scaling and shaping apparatus of claim 4 wherein said used credit count value corresponds to the amount of data that has been moved from each logical queue.

6. The traffic scaling and shaping apparatus of claim 4 wherein said debit count value is a preset value allocated to a corresponding logical queue which is used to decrement from the used credit count during the processing of said corresponding logical queue.

7. The traffic scaling and shaping apparatus of claim 4 wherein said threshold value is a preset value allocated to a corresponding logical queue and which is used to compare against said used credit count value for said corresponding logical queue.

8. The traffic scaling and shaping apparatus of claim 4 wherein said transmit enable flag is set to enable moving of data from a logical queue to an output port if said used credit count is less than the threshold value for said logical queue.

9. The traffic scaling and shaping apparatus of claim 4 wherein said queue priority flag is set to control whether the high priority queue or the low priority queue corresponding to each logical queue can participate respectively in the high priority regulated or low priority regulated queue arbitration process.

10. The traffic scaling and shaping apparatus of claim 4 wherein said unregulated queue flag is used to control whether the unregulated queue corresponding to each logical queue can participate in the unregulated queue arbitration process.

11. The traffic scaling and shaping apparatus of claim 1 wherein said plurality of queue priority arbiters for each output port include a high priority regulated arbiter, a low priority regulated arbiter and an unregulated arbiter, each such queue priority arbiter processing said corresponding valid data queues on a round robin basis.

12. The traffic scaling and shaping apparatus of claim 1 wherein said plurality of port priority arbiters include a high priority regulated arbiter, a low priority regulated arbiter, and an unregulated arbiter, each such port priority arbiter serving to process each corresponding queue from each said output port on a round robin basis.

13. The traffic scaling and shaping apparatus of claim 1 wherein said bus DMA arbiter processes the valid data queues from the plurality of port priority arbiters on a priority basis, the high priority regulated queues being granted DMA bus access first, the low priority regulated queues being granted DMA bus access next, and the unregulated queue being granted DMA bus access last.

14. For use in a high speed computer network device, a method for scaling and shaping the output traffic, said method comprising:

scheduling a plurality of logical queues sequentially, each logical queue having associated therewith valid data queues of at least one priority type;

storing for each logical queue, a plurality of parameter values that are used to control the shaping of output traffic;

manipulating the parameter values corresponding to each of said logical queues dynamically;

allocating to each said valid data queue, corresponding to each said logical queue, a different one of output ports;

performing queue priority arbitration for each valid data queue allocated to each output port to generate a plurality of priority-based queues for said each output port;

performing port priority arbitration for each valid data queue at said each output port according to said priority type to generate a selected valid queue for each priority type; and performing bus DMA arbitration to select a final queue from said selected valid queues of each priority type.

15. The method of claim 14 wherein said scheduling step is controlled by a timing mechanism.

16. The method of claim 14 wherein said valid data queues associated with each logical queue are characterized as a high priority regulated queue, a low priority regulated queue, and an unregulated queue.

17. The method of claim 14 wherein said stored parameter values include for each logical queue, a used credit count value, a debit count value, a threshold value, a transmit enable flag value, a queue priority flag value and an unregulated queue flag value.

18. The method of claim 17 wherein said used credit count value corresponds to the amount of data that has been moved from each logical queue.

19. The method of claim 17 wherein said debit count value is a preset value allocated to a corresponding logical queue for decrementing the used credit count during the processing of said corresponding logical queue.

20. The method of claim 17 wherein said threshold value is a preset value allocated to a corresponding logical queue for comparing with said used credit count value for said corresponding logical queue.

21. The method of claim 17 including setting said transmit enable flag to enable moving of data from a logical queue to an output port if said used credit count is less than the threshold value for said logical queue.

22. The method of claim 17 including setting said queue priority flag to control whether the high priority queue or the low priority queue corresponding to each logical queue can participate respectively in the high priority regulated or low priority regulated queue arbitration process.

23. The method of claim 17 including setting said unregulated queue flag to control whether the unregulated queue corresponding to each logical queue can participate in the unregulated queue arbitration process.

24. The method of claim 14 wherein performing queue priority arbitration for each output port includes performing high priority regulated arbitration, low priority regulated arbitration and unregulated arbitration, said performing high priority regulated arbitration, low priority regulated arbitration, and unregulated arbitration being performed on corresponding high priority, low priority and unregulated queues for each output port on a round robin basis to generate valid data queues of each priority type at each port.

25. The method of claim 14 wherein performing port priority arbitration includes performing high priority regulated arbitration on the valid high priority data queue; performing low priority regulated arbitration on the valid low priority data queue; and performing unregulated arbitration on the valid unregulated data queue, each valid data queue being processed on a round robin basis to generate a selected valid queue for each priority type.

26. The method of claim 14 wherein performing bus DMA arbitration includes processing said selected valid queues of each priority type on a priority basis, said processing step further including granting the high priority regulated queue first DMA bus access, granting the low priority regulated queue next DMA bus access, and granting the unregulated queue last DMA bus access.

* * * * *